(12) United States Patent
Hirao et al.

(10) Patent No.: US 11,429,788 B2
(45) Date of Patent: Aug. 30, 2022

(54) SUMMARY EVALUATION DEVICE, METHOD, PROGRAM AND STORAGE MEDIUM

(71) Applicant: NIPPON TELEGRAPH AND TELEPHONE CORPORATION, Tokyo (JP)

(72) Inventors: Tsutomu Hirao, Tokyo (JP); Masaaki Nagata, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 61 days.

(21) Appl. No.: 16/975,372

(22) PCT Filed: Feb. 14, 2019

(86) PCT No.: PCT/JP2019/005375
§ 371 (c)(1),
(2) Date: Aug. 24, 2020

(87) PCT Pub. No.: WO2019/163643
PCT Pub. Date: Aug. 29, 2019

(65) Prior Publication Data
US 2020/0401797 A1 Dec. 24, 2020

(30) Foreign Application Priority Data
Feb. 26, 2018 (JP) ............... JP2018-032554

(51) Int. Cl.
*G06F 17/00* (2019.01)
*G06F 40/279* (2020.01)
(Continued)

(52) U.S. Cl.
CPC .......... *G06F 40/279* (2020.01); *G06F 40/166* (2020.01); *G06K 9/623* (2013.01);
(Continued)

(58) Field of Classification Search
CPC ...... G06F 40/279; G06F 40/166; G06F 40/30; G06F 40/56; G06F 16/345;
(Continued)

(56) References Cited

U.S. PATENT DOCUMENTS 6,205,456 B1 * 3/2001 Nakao ............... G06F 16/345
715/201
8,533,194 B1 * 9/2013 Ravid ............... G06N 20/00
707/737
(Continued)

OTHER PUBLICATIONS

Davis, Sashka T., et al., "OCCAMS: An Optimal Combinatorial Covering Algorithm for Multi-Document Summarization", 2012 IEEE 12th International Conference on Data Mining Workshops, Brussels, Belgium, pp. 454-463 (Year: 2012).*
(Continued)

*Primary Examiner* — Laurie A Ries (57) ABSTRACT

The present invention relates to a method of accurately evaluating a system summary of a document based on one or more predefined units. The method includes dividing the document and the system summary of the document into the one or more predefined units, sentences and phrases, for example. For each of reference summaries for the document, the method generates an oracle. The oracle is a partial set of units that meet a length limitation and maximize a score generated by an evaluation function for a partial set of the units of the document based on the reference summary. The method further includes determines, based on the generated oracle, scores of the respective units included in the set of the oracle. The method further includes determining the score of the system summary based on the score of the system summary unit.

17 Claims, 3 Drawing Sheets

(51) Int. Cl.
*G06F 40/166* (2020.01)
*G06K 9/62* (2022.01)
*G06V 30/40* (2022.01)

(52) U.S. Cl.
CPC ......... *G06K 9/6215* (2013.01); *G06K 9/6261* (2013.01); *G06V 30/40* (2022.01)

(58) Field of Classification Search
CPC .. G06K 9/00442; G06K 9/6215; G06K 9/623; G06K 9/6261; G06K 9/6264; G06V 30/40
See application file for complete search history.

(56) References Cited

U.S. PATENT DOCUMENTS

| | | | | |
|---|---|---|---|---|
| 9,898,528 | B2* | 2/2018 | Kesin | G06F 16/367 |
| 11,263,714 | B1* | 3/2022 | Edmund | G06F 40/263 |
| 11,269,965 | B2* | 3/2022 | Boni | G06F 16/9535 |
| 2012/0278321 | A1* | 11/2012 | Traub | G06F 16/3331 |
| | | | | 707/736 |
| 2013/0138435 | A1* | 5/2013 | Weber | G10L 25/57 |
| | | | | 704/231 |
| 2015/0206007 | A1* | 7/2015 | Samwel, III | G06F 16/93 |
| | | | | 382/192 |
| 2017/0124479 | A1* | 5/2017 | Baughman | G06N 20/00 |
| 2017/0200270 | A1* | 7/2017 | Reicher | A61B 5/7271 |
| 2018/0101532 | A1* | 4/2018 | Gage | G06F 16/24578 |
| 2018/0196804 | A1* | 7/2018 | Mani | G06F 40/12 |
| 2018/0239959 | A1* | 8/2018 | Bui | G06Q 10/103 |
| 2018/0285685 | A1* | 10/2018 | Singh | G06F 16/9024 |

OTHER PUBLICATIONS

He, Tingting, et al, "ROUGE-C: A Fully Automated Evaluation Method for Multi-Document Summarization", 2008 IEEE International Conference on Granular Computing, pp. 269-274, DOI: 10.1109/GRC.2008.4664680 (Year: 2008).*

Lin, Chin-Yew, "Rouge: A Package for Automatic Evaluation of Summaries," In Proc. of Workshop on text Summarization Branches Out, Jul. 2004.

* cited by examiner

| | $u_1$ | $u_2$ | $u_3$ | ... | $u_m$ |
|---|---|---|---|---|---|
| $c_1$ | $sim(c_1,u_1)cnt(u_1)$ | $sim(c_1,u_2)cnt(u_2)$ | $sim(c_1,u_3)cnt(u_3)$ | ... | $sim(c_1,u_m)cnt(u_m)$ |
| $c_2$ | $sim(c_2,u_1)cnt(u_1)$ | $sim(c_2,u_2)cnt(u_2)$ | $sim(c_2,u_3)cnt(u_3)$ | ... | $sim(c_2,u_m)cnt(u_m)$ |
| ... | ... | ... | ... | $sim(c_i,u_j)cnt(u_j)$ | ... |
| $c_k$ | $sim(c_k,u_1)cnt(u_1)$ | $sim(c_k,u_2)cnt(u_2)$ | $sim(c_k,u_3)cnt(u_3)$ | ... | $sim(c_k,u_m)cnt(u_m)$ |

Fig. 3

SUMMARY EVALUATION DEVICE, METHOD, PROGRAM AND STORAGE MEDIUM

CROSS-REFERENCE TO RELATED APPLICATIONS

This application is a U.S. 371 Application of International Patent Application No. PCT/JP2019/005375, filed on 14 Feb. 2019, which application claims priority to and the benefit of JP Application No. 2018-032554, filed on 26 Feb. 2018, the disclosures of which are hereby incorporated herein by reference in their entireties.

TECHNICAL FIELD

The present invention relates to a summary evaluation apparatus, a method, a program, and a storage medium, and in particular relates to a summary evaluation apparatus, a method, a program, and a storage medium for evaluating a system summary.

BACKGROUND ART

Conventionally, in the field of natural language processing in which language is automatically processed using a computer, there has been a technique for automatically grading a system summary using a correct summary created by a human (hereinafter referred to as a reference summary) when the reference summary is provided.

As a method for automatically evaluating a summary, a method is often used in which a determination is made based on the degree of matching between a system summary and a reference summary for smaller fragments in a sentence, such as n-grams or tuples, as in ROUGE (NPL 1) or Basic Elements.

CITATION LIST

Non Patent Literature

[NPL 1] Chin-Yew Lin. 2004. ROUGE: A Package for Automatic Evaluation of Summaries. In Proc. of Workshop on Text Summarization Branches Out. pages 7481.

SUMMARY OF THE INVENTION

Technical Problem

Evaluation methods such as ROUGE and Basic Element are used to evaluate system summaries according to whether or not there are fragments smaller than sentences in the text. On the other hand, many summarization systems generate summaries by extracting meaningful fragments in the text, such as "sentences" or "phrases".

Accordingly, in consideration of performing system error analysis, analysis can be performed more intuitively by seeing whether or not extraction of "sentences" or "phrases" was successful than by seeing whether or not extraction of n-grams or tuples was successful. However, in automatic summary evaluation, ROUGE and Basic Elements are de-facto standards, and thus it is required that their scores are improved.

The present invention was achieved in order to resolve the foregoing problems, and it is an object thereof to provide a summary evaluation apparatus, a method, a program, and a storage medium, according to which it is possible to accurately evaluate a system summary with consideration given to the meaning of each unit.

Means for Solving the Problem

In order to achieve the above-described object, a summary evaluation apparatus according to a first aspect of the invention is constituted by including: a unit division portion configured to divide a document to be summarized and a system summary generated in advance for the document to be summarized, into predetermined units; an oracle generation portion configured to, for each reference summary created in advance for the document to be summarized, generate an oracle based on the reference summary and a set of the units of the document to be summarized, the oracle being a subset of units of the document to be summarized that satisfy a length restriction and maximize a score of an evaluation function for the subset of units with respect to the reference summary; an oracle unit score determination portion configured to determine a score of each unit included in a set of the oracles based on the oracles generated for the reference summaries; a system unit score determination portion configured to, for each unit of the system summary, obtain a corresponding unit from among the units included in the set of oracles and determine a score of the unit of the system summary; and an evaluation score determination portion configured to determine a score of the system summary based on the scores of the units of the system summary.

A summary evaluation method according to a second aspect of the invention includes and executes the steps of: a unit division portion dividing a document to be summarized and a system summary generated in advance for the document to be summarized, into predetermined units; an oracle generation portion generating, for each reference summary created in advance for the document to be summarized, an oracle based on the reference summary and a set of the units of the document to be summarized, the oracle being a subset of units of the document to be summarized that satisfy a length restriction and maximize a score of an evaluation function for the subset of units with respect to the reference summary; an oracle unit score determination portion determining a score of each unit included in a set of the oracles based on the oracles generated for the reference summaries; a system unit score determination portion obtaining, for each unit of the system summary, a corresponding unit from among the units included in the set of the oracles, and determining a score of the unit of the system summary; and an evaluation score determination portion determining a score of the system summary based on the scores of the units of the system summary.

A program according to a third aspect of the invention is a program for causing a computer to function as the portions of the summary evaluation apparatus according to the first aspect of the invention.

A storage medium according to a fourth aspect of the invention is a storage medium storing a program for causing a computer to function as the portions of the summary evaluation apparatus according to the first aspect of the invention.

Effects of the Invention

According to the summary evaluation apparatus, method, program, and storage medium of the present invention, the following effect can be obtained. A system summary can be accurately evaluated with consideration given to the meaning of each unit by dividing a document to be summarized and a system summary generated in advance for the document to be summarized, into predetermined units, generating an oracle for each reference summary created in advance for the document to be summarized, based on the reference summary and a set of the units of the document to be summarized, the oracle being a subset of units of the document to be summarized that satisfy a length restriction and maximize a score of an evaluation function for the subset of units with respect to the reference summary, determining the scores of the units included in the set of oracles based on the generated oracles, obtaining, for each unit of the system summary, a corresponding unit from among the units included in the set of oracles and determining the score of the unit of the system summary, and determining the score of the system summary based on the scores of the units of the system summary.

DESCRIPTION OF EMBODIMENTS

Hereinafter, embodiments of the present invention will be described in detail with reference to the drawings.

Overview of Embodiment of the Present Invention

In the embodiment of the present invention, an automatic evaluation index is proposed which uses an oracle, which is a summary that, when an extraction unit of a summary system is set, maximizes ROUGE and Basic Elements based on the extraction unit. By using this automatic evaluation index, it is possible to intuitively analyze whether or not a summary system has successfully extracted sentences or phrases. Furthermore, maximizing the automatic evaluation score leads to maximizing ROUGE and Basic Elements, and therefore the automatic evaluation score itself can also be given a strong correlation to ROUGE and Basic Elements.

Figure 1:
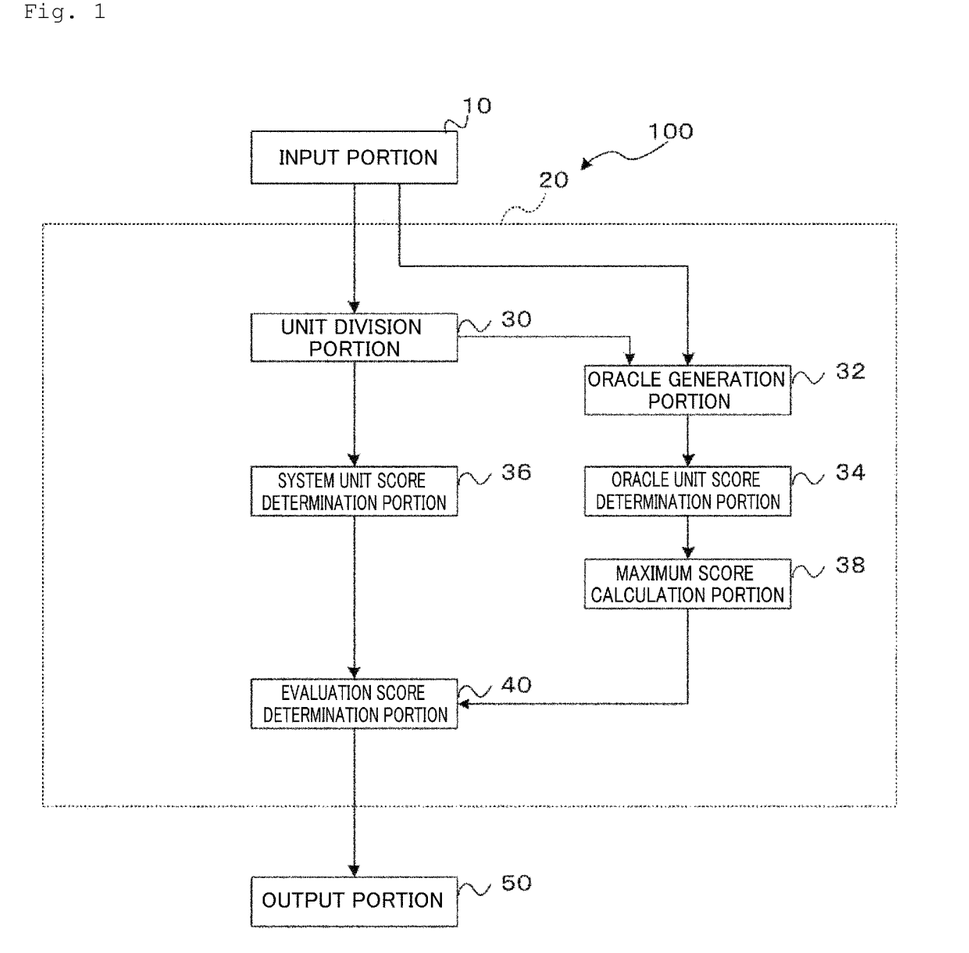
FIG. 1 is a block diagram showing a configuration of a summary evaluation apparatus according to an embodiment of the present invention.

Configuration of Summary Evaluation Apparatus of Embodiment of Present Invention Next, a configuration of the summary evaluation apparatus according to the embodiment of the present invention will be described. As shown in FIG. 1, a summary evaluation apparatus 100 according to the embodiment of the present invention can be constituted by a computer including a CPU, a RAM, and a ROM storing programs and various types of data for executing a later-described summary evaluation processing routine. As shown in FIG. 1, the summary evaluation apparatus 100 functionally includes an input portion 10, a computation portion 20, and an output portion 50.

The input portion 10 receives, as input, an original document (hereinafter referred to simply as "document") to be summarized, K reference summaries created for the document to be summarized, and a system summary generated for the document to be summarized. Note that as the document, a document group may also be received, and reference summaries and system summaries corresponding to the document group may also be received.

The computation portion 20 is constituted by including a unit division portion 30, an oracle generation portion 32, an oracle unit score determination portion 34, a system unit score determination portion 36, a maximum score calculation portion 38, and an evaluation score determination portion 40.

An overview of the inputs and outputs of the processing portions of the computation portion 20 will be described next. First, the unit division portion 30 is used to divide the document and the system summary into units (sentences, phrases, and the like). Next, the K reference summaries and the original document (group) that was divided into units are input to the oracle generation portion 32 and K oracles are obtained. Here, an oracle is a set of units that maximize the ROUGE and Basic Elements, which are summary evaluation functions. Then, scores of 1 to K are given by the oracle unit score determination portion 34 to the units included in the obtained oracles. Here, a unit included in all of the K oracles acquires a score of K, and a unit that appears in only one oracle receives a score of 1. Next, correspondence relationships between the units included in the system summary and the units included in the oracles are determined, and the scores of the system units are determined by the system unit score determination portion 36 with consideration given to the scores of the oracle units. Here, in order to normalize the sum of the system unit scores to a score of [0,1], the maximum score calculation portion 38 calculates the maximum value of sums of the oracle unit scores under a summary length provided using the oracle unit scores. The evaluation score determination portion 40 outputs an evaluation score by dividing the sum of the system unit scores by the maximum value of the sum of the oracle unit scores.

Next, details of the processing units of the computation portion 20 will be described.

The unit division portion 30 divides the document to be summarized and the system summary generated for the document, which were received by the input portion 10, into pre-determined units. In the division, the document to be summarized and the system summary are divided into a continuous series of units that are continuous and meaningful in the text, such as "sentences" and "phrases". When "sentences" are considered as units, it is sufficient to use punctuation marks as clues, or to use an existing sentence boundary identification tool. Similarly, if "phrases" are considered, it is sufficient to use an existing phrase boundary identification tool. The document and the system summary are expressed as unit set $S=\{S_1, S_2, \ldots, S_n\}$, $C=c_1, c_2, \ldots, c_k\}$ by the unit division portion 30.

For each of the K reference summaries created for the document received by the input portion 10, the oracle generation portion 32 generates an oracle based on the reference summary and the set of units of the document divided by the unit division portion 30, the oracle being a subset of units of the document to be summarized that satisfy a length restriction and maximize the score of an evaluation function for the subset of the units with respect to the reference summary. The oracle is defined by the following Formula (1) as a subset of units of the document that maximize a certain evaluation function, under a length restriction.

Formula 1

$$O = \underset{H \subseteq S}{\mathrm{argmax}}\, f(R, H) \quad (1)$$

$$\text{s.t.}\ \ell(H) \leq L_{max}.$$

R is a set of reference summaries, H is a unit set, f is a function for giving an evaluation score to the set of reference summaries and the unit set, and ROUGE, Basic Elements, or the like can be used thereas. $L_{max}$ is the restriction on the summary length, and the length (number of words, number of bytes) of the reference summary is used thereas. In order to generate an oracle, it is sufficient to use the technique disclosed in NPL 2. The oracle generation portion 32 generates K oracles $O_1, O_2, \ldots,$ and $O_K$ for the K reference summaries accepted as inputs.

[NPL 2] Tsutomu Hirao, Masaaki Nishino, Jun Suzuki, and Masaaki Nagata. 2017. Enumeration of extractive oracle summaries. In Proc. of the 15th Conference of the European Chapter of the Association for Computational Linguistics (EACL). pages 386396.

The oracle unit score determination portion 34 determines the scores of the units included in the set of oracles based on the oracles generated for the reference summaries by the oracle generation portion 32. The scores of the units included in the K oracles are determined using information indicating the number of oracles in which each unit appears. Here, when $$U = \bigcup_{i=1}^{K} O_i$$

is used as the unit set included in K oracles, the score of an element u of U is expressed as cnt(u). cnt( ) is a function that returns the number of oracles in which u appears. That is, cnt( ) has a maximum of K and a minimum of 1.

For each unit of the system summary, the system unit score determination portion 36 obtains a corresponding unit from among the units included in the set of oracles and determines the score of the unit of the system summary.

Figure 2:
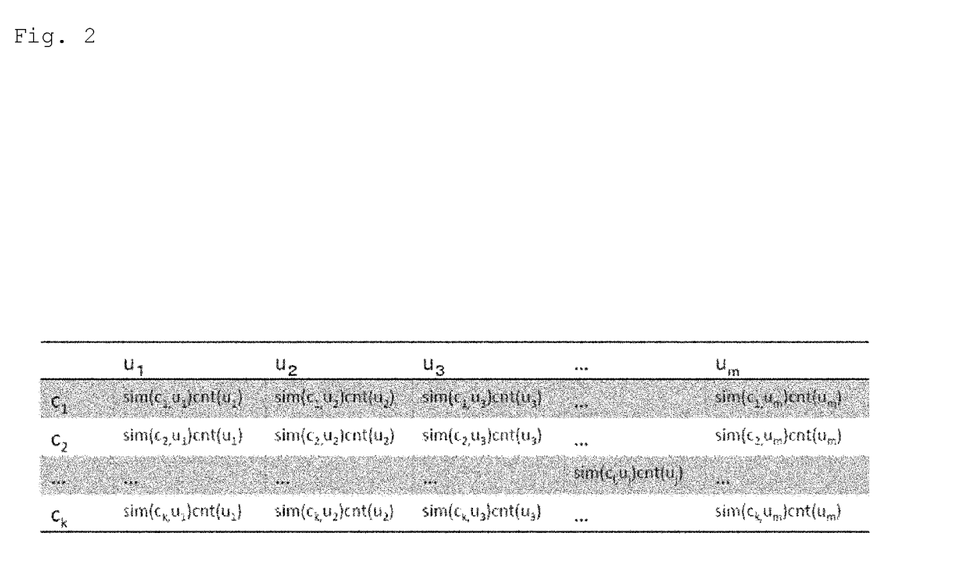
FIG. 2 is a diagram showing an example of a correspondence relationship in a unit allocation problem.

As will be described below, the score of each unit c of a unit set C obtained from the system summary is determined using the score of each unit u of the unit set U obtained from the oracles. Put simply, the score of c is cnt(u), which is the score of u that is the most similar to c in U, but if all of the elements in the unit set C are similar, all of the elements will be associated with the same u and will obtain a high score. In order to avoid this, one unit u of the system summary is allocated to a unit c included in the set of oracles by solving the allocation problem of Formula (2) below, which is provided with a restriction such that there is at most one u that is associated with a c. The correspondence relationship between $c_i$ and $u_j$ is shown in FIG. 2.

Formula 2

$$\text{maximize}\ \sum_{i=1}^{k}\sum_{j=1}^{m} sim(c_i, u_j) cnt(u_j) x_{i,j} \quad (2)$$

$$\text{s.t.}\ \forall_i \sum_{j=1}^{m} x_{i,j} = 1$$

$$\forall_j \sum_{i=1}^{k} x_{i,j} \leq 1$$

$x_{i,j}$ is a binary variable that is 1 when $c_i$ and $u_j$ are associated with each other, and is 0 if not, and sim(,) is a function that returns the degree of similarity between two units. Various types of degrees of similarity that have been proposed before can be used as sim(,). For example, it is sufficient to use the longest matching common partial word string between $c_i$ and $u_j$ that has been normalized to a score of [0,1]. In this manner, for each unit of the system summary, a corresponding unit is obtained from among the units included in the set of oracles based on a degree of similarity obtained using a partial character string that is common between units.

By solving the allocation problem, the U that is optimal for $c_i$ is determined, and there is at most one c that is associated with $u_j$. Letting o(i) be the index of u associated with $c_i$, the score of the unit $c_i$ of the system summary is $c_i = \text{sim}(c_i, u_{o(i)}) cnt(u_{o(i)})$. Accordingly, the score of the system summary is the sum of the scores of the units, and is expressed by Formula (3) below.

Formula 3

$$\text{Score}(C) = \sum_{i=1}^{k} sim(c_i, u_{o(i)}) cnt(u_{o(i)}) \quad (3)$$

The maximum score calculation portion 38 calculates the maximum score of combinations of units included in the set of oracles by selecting combinations of units that satisfy a length restriction from among the units included in the set of oracles. Since the Score (C), which was obtained by the system unit score determination portion 36, has not been normalized and is difficult to handle as-is, the maximum score of the oracles is obtained to normalize Score (C) to a value of [0,1]. Here, since the score cnt(u) has been given to the elements of U, a summary that obtains the maximum score by combining u under the length restriction of the summary is obtained by solving an integer programming problem of Formula (4) below.

Formula 4

$$\text{maximize}\ \sum_{j=1}^{m} cnt(u_j) x_j \quad (4)$$

$$\text{s.t.}\ \sum_{j=1}^{u} \ell_j \leq L_{max}.$$

Here, $x_j$ is a binary variable indicating whether or not the j-th unit is to be included in the summary, and $l_j$ indicates the length (number of words or number of bytes) of the j-th unit.

The evaluation score determination portion 40 normalizes the scores of the units of the system summary based on the maximum score obtained by the maximum score calculation portion 38 and thus determines the score of the system summary.

Letting Scoremax be the maximum score of the summary obtained by the maximum score calculation portion 38, the sum of the normalized scores of the units of the system summary is obtained using Formula (5) below.

Formula 5

$$\text{norm\_Score}(C) = \frac{\sum_{i=1}^{k} sim(c_i, u_{o(i)}) cnt(u_{o(i)})}{Score_{max}} \quad (5)$$

Note that if the scores are to be handled without being normalized, it is sufficient that the scores of the units of the system summary are obtained using Formula (3) above.

As described above, according to the method of the embodiment of the present invention, for each of the K reference summaries, an oracle can be obtained, which is a set of units such as sentences and phrases that maximize a conventional evaluation score, such as ROUGE or Basic Elements, and the units of the system can be evaluated based on the units included in the oracles, with consideration given to sentences, phrases, and the like.

Also, by determining the score by solving the allocation problem of the correspondence relationship between the units of the oracles and the units of the system, it is possible to prevent some of the units from unexpectedly obtaining a high score.

Also, it is clear which units the summary system has failed to select and which units the summary system successfully selected.

Action of Summary Evaluation Apparatus of Embodiment of Present Invention

Next, actions of the summary evaluation apparatus 100 according to the embodiment of the present invention will be described. When the input portion 10 receives a document to be summarized, K reference summaries created for the document to be summarized, and a system summary generated for the document to be summarized, the summary evaluation apparatus 10 executes the summary evaluation processing routine shown in FIG. 3.

Figure 3:
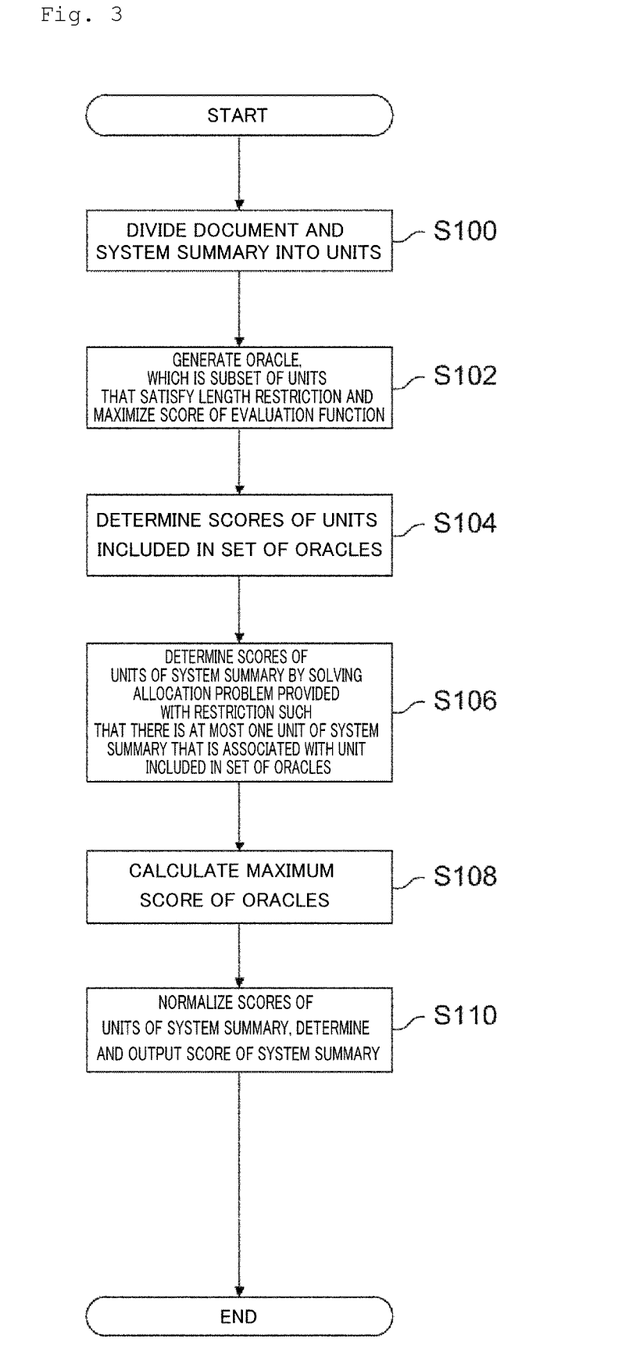
FIG. 3 is a flowchart showing a summary evaluation processing routine of a summary evaluation apparatus according to an embodiment of the present invention.

First, in step S100, the document to be summarized and the system summary generated for the document, which were received by the input portion 10, are divided into predetermined units.

Next, in step S102, for each of the K reference summaries created for the document received by the input portion 10, an oracle is generated according to Formula (1) above based on the reference summary and the set of units of the document divided by the unit division portion 30, the oracle being a subset of units of the document to be summarized that satisfy a length restriction and maximize the score of an evaluation function for the subset of units with respect to the reference summary.

In step S104, the scores of the units included in the set of oracles are determined based on the oracles generated for the reference summaries in step S102.

In step S106, the scores of the units of the system summary are determined by, for each unit of the system summary, solving the allocation problem of Formula (2) above, which is provided with a restriction such that there is at most one unit u of the system summary that is associated with a unit c included in the set of oracles from among the units included in the set of oracles.

In step S108, the maximum score of combinations of units included in the set of oracles is calculated by selecting combinations of units included in the oracles that satisfy the length restriction according to Formula (4) above from among the units included in the set of oracles.

In step S110, based on the maximum score obtained in step S108, the scores of the system summary units are normalized according to Formula (5) above, the score of the system summary is determined, and the score is output to the output portion 50.

As described above, according to the summary evaluation apparatus according to the embodiment of the present invention, with the following steps, it is possible to accurately evaluate a system summary with consideration given to the meaning of each unit.

(1) A document to be summarized and a system summary generated in advance for the document to be summarized are divided into predetermined units.

(2) For each reference summary created in advance for the document to be summarized, an oracle is generated based on the reference summary and a set of the units of the document to be summarized, the oracle being a subset of units of the document to be summarized that satisfy a length restriction and maximize a score of an evaluation function for the subset of units with respect to the reference summary.

(3) The scores of the units included in the set of oracles are determined based on the generated oracles.

(4) For each unit of the system summary, a corresponding unit is obtained from among the units included in the set of oracles and the score of the unit of the system summary is determined.

(5) The score of the system summary is determined by normalizing the scores of the units of the system summary based on the maximum score of the oracle.

Note that the present invention is not limited to the above-described embodiment and various modifications and applications are possible without departing from the gist of the invention.

Also, although the above-described embodiment was described as an embodiment in which a program is installed in advance, the program can also be provided stored in a computer-readable storage medium, and can also be provided via a network.

REFERENCE SIGNS LIST

10 Input portion
20 Computation portion
30 Unit division portion
32 Oracle generation portion
34 Oracle unit score determination portion
36 System unit score determination portion
38 Maximum score calculation portion
40 Evaluation score determination portion
50 Output portion
100 Summary evaluation apparatus

The invention claimed is:

1. A computer-implemented method for evaluating aspects of a document, the method comprising:
receiving a document;
receiving a system summary of the document, wherein the system summary of the document is a machine-generated summary of the document;
receiving a plurality of reference summaries;
dividing, based on a predetermined unit, the document into units of the document;
dividing, based on the predetermined unit, the system summary of the document into units of the system summary;
generating, based on the plurality of reference summaries and the document, a set of oracles associated with the plurality of reference summaries, wherein each oracle is a subset of units of the document that satisfy a text length restriction and maximize a score of an evaluation for the subset of the units of the document;
determining, based on the generated set of oracles for each reference summary, a score of each unit included in the generated set of oracles;
for each unit of the system summary, allocating a corresponding unit in the set of oracles, wherein the corresponding unit is a distinct unit among the units in the set of oracles;
determining, based on the corresponding unit in the set of oracles, a score of each unit of the system summary; and
determining, based on a set of the determined score of each unit of the system summary, a score for the system summary.

2. The computer-implemented method of claim 1, wherein the oracle is a set of units that maximizes at least one of automatic summary evaluation processes as the evaluation, the evaluation including one of: the ROUGE, and Basic Elements.

3. The computer-implemented method of claim 1, wherein the predetermined unit comprises one or more of a sentence and a phrase in the document.

4. The computer-implemented method of claim 1, the method further comprising:
for each unit of the system summary, receiving, based on a degree of similarity between the unit and respective units in the set of oracles, a corresponding unit in the units in the set of oracles, wherein the degree of similarity is based on a partial character string that is common between the unit and the respective units.

5. The computer-implemented method of claim 1, the method further comprising:
selecting, from the units in the set of oracles, at least one combination of units satisfying the length restriction;
generating the maximum score of the set of oracles based on the selected at least one combination of units; and
normalizing the score of the unit of the system summary based on the generated maximized score for determining the score for the system summary.

6. The computer-implemented method of claim 1, wherein:
when the generated units of the documents and the generated units of the system summary each represents a continuous series of units in texts based on one of:
a sentence using one or more punctuation marks and sentence boundaries, or
a phrase based on phrase boundary identifications.

7. A system for evaluating aspects of a document, the system comprises:
a processor; and
a memory storing computer-executable instructions that when executed by the processor cause the system to:
receive a document;
receive a system summary of the document, wherein the system summary of the document is a machine-generated summary of the document;
receive a plurality of reference summaries;
divide, based on a predetermined unit, the document into units of the document;
divide, based on the predetermined unit, the system summary of the document into units of the system summary;
generate, based on the plurality of reference summaries and the document, a set of oracles associated with the plurality of reference summaries, wherein each oracle is a subset of units of the document that satisfy a text length restriction and maximize a score of an evaluation for the subset of the units of the document;
determine, based on the generated set of oracles for each reference summary, a score of each unit included in the generated set of oracles;
for each unit of the system summary, allocate a corresponding unit in the set of oracles, wherein the corresponding unit is a distinct unit among the units in the set of oracles;
determine, based on the corresponding unit in the set of oracles, a score of each unit of the system summary; and
determine, based on a set of the determined score of each unit of the system summary, a score for the system summary.

8. The system of claim 7, wherein the oracle is a set of units that maximizes at least one of automatic summary evaluation processes as the evaluation, the evaluation including one of: the ROUGE, and Basic Elements.

9. The system of claim 7, wherein the predetermined unit comprises one or more of a sentence and a phrase in the document.

10. The system of claim 7, the computer-executable instructions when executed further causing the system to:
for each unit of the system summary, receive, based on a degree of similarity between the unit and respective units in the set of oracles, a corresponding unit in the units in the set of oracles, wherein the degree of similarity is based on a partial character string that is common between the unit and the respective units.

11. The system of claim 7, the computer-executable instructions when executed further causing the system to:
select, from the units in the set of oracles, at least one combination of units satisfying the length restriction;
generate the maximum score of the set of oracles based on the selected at least one combination of units; and
normalize the score of the unit of the system summary based on the generated maximized score for determining the score for the system summary.

12. The system of claim 7, wherein:
when the generated units of the documents and the generated units of the system summary each represents a continuous series of units in texts based on one of:
a sentence using one or more punctuation marks and sentence boundaries, or
a phrase based on phrase boundary identifications.

13. A computer-readable non-transitory recording medium storing computer-executable instructions that when executed by a processor cause a computer system to:
receive a document;
receive a system summary of the document, wherein the system summary of the document is a machine-generated summary of the document;
receive a plurality of reference summaries;
divide, based on a predetermined unit, the document into units of the document;
divide, based on the predetermined unit, the system summary of the document into units of the system summary;
generate, based on the plurality of reference summaries and the document, a set of oracles associated with the plurality of reference summaries, wherein each oracle is a subset of units of the document that satisfy a text length restriction and maximize a score of an evaluation for the subset of the units of the document;

determine, based on the generated set of oracles for each reference summary, a score of each unit included in the generated set of oracles;

for each unit of the system summary, allocate a corresponding unit in the set of oracles, wherein the corresponding unit is a distinct unit among the units in the set of oracles;

determine, based on the corresponding in from the set of oracles, a score of each unit of the system summary; and determine, based on a set of the determined score of each unit of the system summary, a score for the system summary.

14. The computer-readable non-transitory recording medium of claim 13, wherein the oracle is a set of units that maximizes at least one of automatic summary evaluation processes as the evaluation, the evaluation including one of: the ROUGE, and Basic Elements.

15. The computer-readable non-transitory recording medium of claim 13, wherein the predetermined unit comprises one or more of a sentence and a phrase in the document.

16. The computer-readable non-transitory recording medium of claim 13, the computer-executable instructions when executed further causing the system to:

for each unit of the system summary, receive, based on a degree of similarity between the unit and respective units in the set of oracles, a corresponding unit in the units in the set of oracles, wherein the degree of similarity is based on a partial character string that is common between the unit and the respective units.

17. The computer-readable non-transitory recording medium of claim 13, the computer-executable instructions when executed further causing the system to:

select, from the units in the set of oracles, at least one combination of units satisfying the length restriction;

generate the maximum score of the set of oracles based on the selected at least one combination of units; and normalize the score of the unit of the system summary based on the generated maximized score for determining the score for the system summary.

\* \* \* \* \*